Aug. 31, 1937.  G. W. CRABTREE  2,091,352
SPRING COVER
Filed March 2, 1935   2 Sheets-Sheet 1
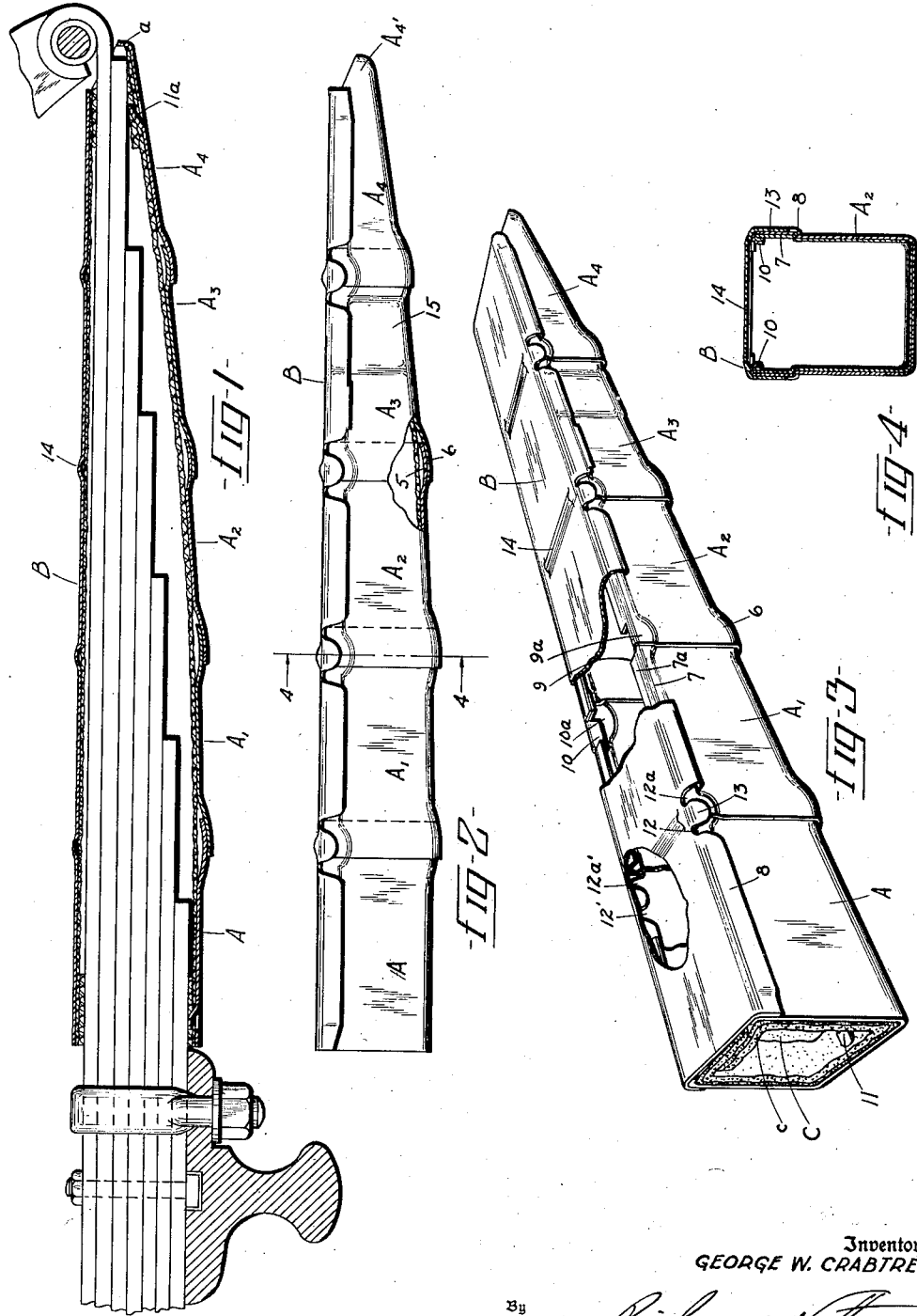
Inventor
GEORGE W. CRABTREE Aug. 31, 1937.  G. W. CRABTREE  2,091,352
SPRING COVER
Filed March 2, 1935  2 Sheets-Sheet 2
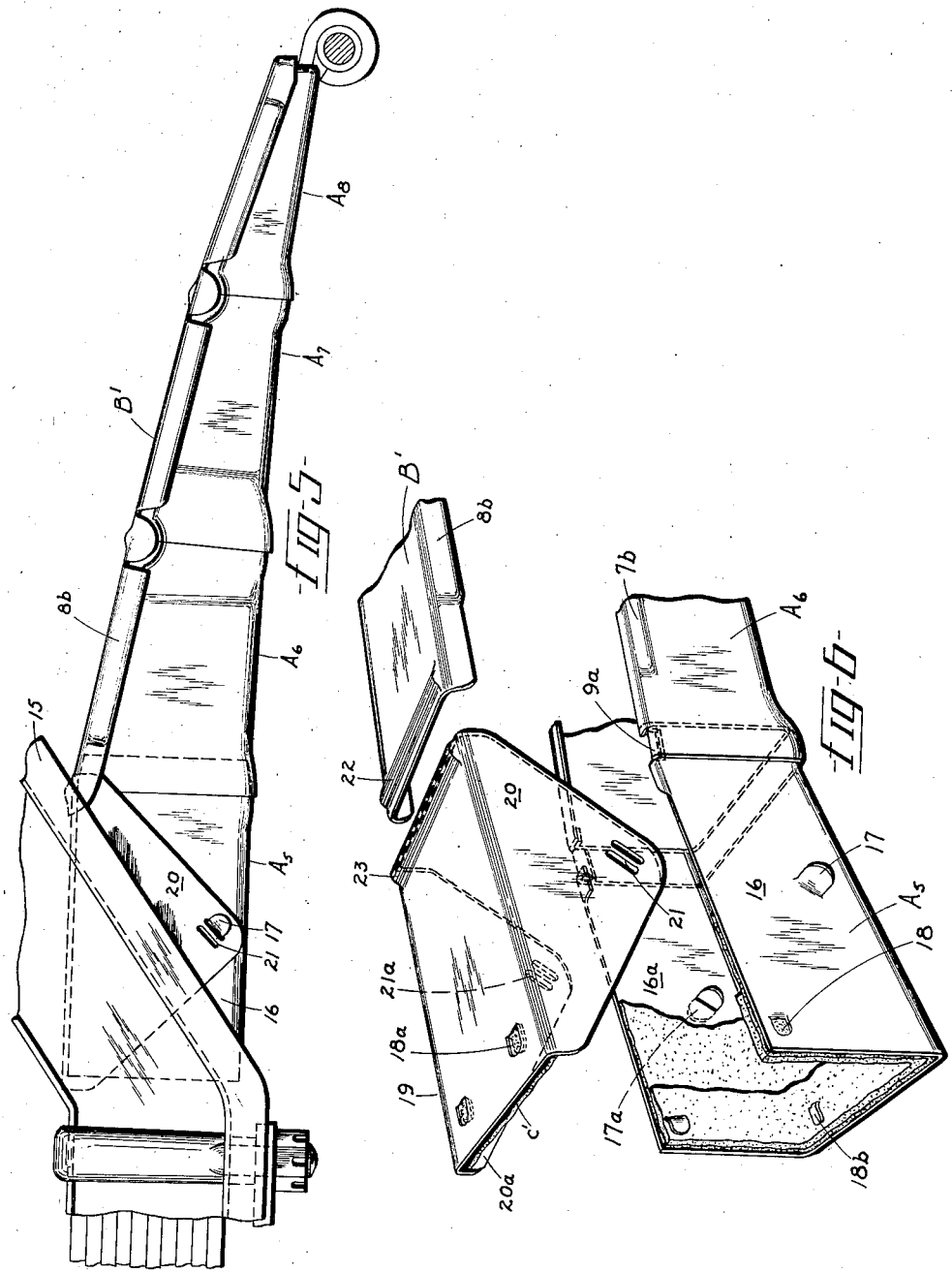
Inventor
GEORGE W. CRABTREE
By Richey & Watts
Attorney Patented Aug. 31, 1937

2,091,352

UNITED STATES PATENT OFFICE 2,091,352

SPRING COVER

George W. Crabtree, Cleveland Heights, Ohio

Application March 2, 1935, Serial No. 9,098

9 Claims. (Cl. 267—37)

This invention relates to improvements in covers or casings for laminated vehicle springs, and the primary object of the same is to provide a leaf spring cover assembly of the jointed section type which is practical and efficient in service and which at the same time is relatively simple in construction and assemblage and capable of economical or low cost manufacture.

The present invention is concerned broadly with a spring cover assembly of the type illustrated and described in my copending application Serial No. 9,097, filed March 2, 1935 and deals particularly with an alternate type of cap or cover for the jointed box sections and hinge construction for said sections and other features whereby the assembly is better adapted for certain types of vehicle springs.

In the drawings:

Figure 1 is a substantially central longitudinal sectional view of a spring cover constructed in accordance with the present invention shown applied to a vehicle spring;

Figure 2 is a view in side elevation and partly broken away of the cover;

Figure 3 is a view in perspective with part of the top cover member broken away to show the interior construction;

Figure 4 is a transverse section taken about on the line 4—4, Figure 2;

Figure 5 is a view in side elevation of a cover assembly particularly adapted for springs having parts mounted thereover or adjacent thereto which tend to restrict installation of spring covers and freedom in flexing during subsequent service;

Figure 6 is a dissembled, fragmentary perspective view of the cover shown in Figure 5.

The assembly comprises a plurality of jointed body or box sections generally indicated at A, $A^1$, $A^2$, $A^3$, $A^4$ and a cap or cover section B. The body sections are substantially identical in construction except the first and last sections, which have their respective outer ends adapted to the spring contour at these points and to also snugly engage and retain a liner C in position in the cover. Considering, for example, the sections $A^1$ and $A^2$, the one end of $A^1$ telescopes partly into the adjacent end of $A^2$, and at the bottom of the cover, the ends are formed with interfitting arcuate bearing portions 5 and 6 as between $A^2$ and $A^3$ in Figure 2.

This construction provides in effect a ball or rocking joint at the lower part of the sections. The arcuate bearing portions may be struck from the center of the hinge at the top of the sections so as to provide true coacting bearing surfaces.

The upper opposed free edge portions of each of the sections are each formed with an outwardly-pressed snap-on bead 7 adapted to engage an inturned snap-on flange 8 formed on each side of the cap B, and the telescoping ends of the sections have the top inturned flange portions 7a notched as at 9, to provide hinge tongues 10 which are bent down within the outwardly-pressed snap-on beads 7, clamping the ends together at this point and forming a series of hinge joints along the length of the top of the cover.

It will be noted that the hinge tongues 10 extend from the pivotal center of the sections to and including the end of each outer telescoped section, thereby limiting the upward swing or arcuate turning movement at the joints between the sections or forming a stop which prevents separation at the bottom joints due to excess leverage which may be inadvertently applied during handling or installation of the cover assembly, while at the same time permitting ample arcuate turning movement to conform to spring flexure during service. The notches 9 may be formed by a single operation, or in other words, the tongues 10 may be struck out and bent over in both sections at one time. Thus the sections are locked against displacement yet are permitted sufficient pivotal play or movement to provide a hinge action with pivotal points at 9a and 10a by the simple operation of stamping or cutting out the tongues 10.

The body sections, thus formed and assembled, may be provided with the liner C, which is preferably of canvas or similar material with sealing end portions of felt or the like, as at c; and the end sections A and $A^4$ are formed with tongues 11 and 11a which hook into the felt or canvas and may be bent down over the latter.

The end section $A^4$ has the bottom wall of the free end thereof extended as at $A^{4\prime}$ and bent upwardly as at a over the end of the second leaf of the spring to assist in sealing the cover at this point.

The body or box sections may be assembled and applied over the spring in assembled relation, the cap or cover then being snapped into place thereon. This cap is preferably of integral or one-piece formation and to localize the flexing action within the region of the hinge joints said cap is provided with a series of notches or cut-out portions 12, 12' and 12a, 12a' in the region of the joints between the sections. This permits flexing of the cap at the joints without becoming displaced or strained, a tab or stiffening tongue 13 being provided between the said cut-out portions.

Formed transversely between each set of tongues 13 is a reinforcing rib 14. These ribs ensure against possible breakage of the cap at the point where the flexing action is greatest, viz, transversely between the opposed cut-out portions 12 and 12' and 12a, 12a'. From practical experience, I have found that, without these ribs if any breakage took place under long continuous service, it occurred transversely across the cap in the region of the opposed recesses or cut-out portions. Tests showed that when the cap was applied, the "spring" which resulted from the transverse spread of the cap flanges caused a slight concavity longitudinally of the cap in the region of the said cut-outs, and then when the cap was flexed during service, the edges at the cut-outs or recesses were placed under tension, which eventually started a break at these points and thence across the cap. The ribs prevent the concavity from forming initially while at the same time a free transverse area between the opposed cut-outs is provided. The use of two pairs of cut-outs instead of one pair at each joint distributes the bending stresses over a wider area.

A bulge is provided at 15 to accommodate spring clips which are preferably of the type illustrated in my copending application Serial No. 6,966, filed February 18, 1935.

In Figures 5 and 6, a cover assembly is shown which is particularly adapted for installations having parts cooperating with or lying adjacent the spring which tend to cramp or restrict installation of the cover and also its freedom of movement in subsequent service. An example of this is in the current model of the Ford automobile, and the illustration in Figure 5 shows a portion of a Ford spring having a channel member or bracket, indicated at 15, clamped over the central portion thereof. The cover assembly in this instance is provided with body or box sections $A^5$, $A^6$, $A^7$, and $A^8$, the sections $A^6$, $A^7$ and $A^8$ being substantially similar to those shown in Figures 1 to 4, inclusive. The cap member indicated at B' is also substantially similar to the cap B and overlies the section $A^6$, $A^7$ and $A^8$.

The section $A^5$ has a particular construction to accommodate the installation above noted. This section $A^5$ is provided with side walls 16 and 16a having straight free edges. The said side walls have struck outwardly therefrom, locking tongues or tabs 17 and 17a and liner-engaging tongues or tabs 18, 18a and 18b. The sections $A^5$ and $A^6$ are locked together by a joint construction 9a which may be substantially similar to that shown in Figures 1 to 4, inclusive. A cap member 19 is provided and has side walls 20 and 20a which engage or telescope over the side walls 16 and 16a of the section $A^5$ and are provided with slots 21 and 21a adapted to receive the tongues 17, 17a whereby the cap 19 may be locked to the section $A^5$ simply by bending the latter tongues downwardly against the side walls 20 and 20a. It is preferred to provide a plurality of slots 21 for adjusting purposes so that the cap or cover member 19 may be permitted a limited amount of leeway to accommodate springs varying in thickness. The tongues 18, 18a, 18b are struck inwardly of the walls of the section $A^5$ and are adapted to engage a liner to hold the latter against displacement in a manner similar to the tongues 11 and 11a hereinbefore referred to. The adjacent section $A^6$ is provided with snap-on beads 7b which terminate short of the one end of the section, and the cap B' is provided with a similar snap-on flange 8b which also terminates a suitable distance short of the one end of the cap. The cap B' has formed on the one end thereof a transverse locating rib 22 adapted to engage under a coacting pivotal reinforcing rib 23 formed on the contiguous end of the cap 19.

It will be noted that the section $A^5$ with its coacting cap or cover 19 lacks any laterally projecting portions such as the bead 7b and flange 8b which would hinder its insertion in a restricted space. Pivotal ribs 22 and 23 interfit and form a sealed pivotal connection for adjustment of cap 19 to suit springs varying in thickness, and slots 21 and 21a and tongues or tabs 17 and 17a lie in the same radius struck from 22 and 23 to accommodate such adjustment.

In applying the assembly to a spring, assuming a liner has been disposed in the box sections $A^5$ to $A^8$ with its sealing end engaged by tongues 18, 18b of section $A^5$ and a coating of lubricant applied to the spring and/or liner, the said box or body sections may be inserted over the sides and bottom of the spring, the liner being securely held in place so that the said sections may be pushed in between the sides of the member 15 without causing displacement of the liner. The cap or cover 19 is preferably provided with a separate pad or liner c' and the cap with the pad attached may be inserted longitudinally between the side walls of the channel member 15 in place over the section $A^5$, the tongues 17 and 17a being passed through the slots 21 and 21a and bent downwardly as shown in Figure 5, thereby locking the cap 19 to the section $A^5$. The cap B' may then be applied with the rib 22 first inserted over the locating rib 23, note Figure 5.

In both forms of the cover assembly, it will be noted that the cap B may be snapped into place easily and quickly, and is retained in position simply by its snap-on engagement with the body or box sections.

It will be understood that the method of formation and assembly of the various parts of the improved cover as set forth herein are simply given by way of example and that other methods of fabrication and construction may be adopted without departing from the scope of the invention as defined by the appended claims.

I claim:

1. A cover for leaf springs comprising a plurality of substantially U-shaped body sections adapted to be inserted over three sides of a spring, said sections being formed with arcuately-pressed telescoped end portions defining coacting bearing joints and connected to one another in a manner such as to provide a hinge joint, the opposed free edges of said sections having pressed outwardly therefrom snap-on beads, and a one-piece cap member having substantially continuous snap-on flanges adapted to engage said beads, said flanges being interrupted in the region of said joints by a series of cut-out portions to facilitate flexing of the cap member.

2. A cover for leaf springs comprising a plurality of substantially U-shaped body sections adapted to be inserted over three sides of a spring, said sections having their end portions arranged in telescoped relation and connected to one another to provide a series of flexible joints, the joint at the point of greatest flexure being formed by pressing the telescoped end portions of the sections into arcuate bearing shapes and the joint at the point of least flexure being formed by tongues which are struck out from the metal of the sections and bent downwardly, and a cap for said sections.

3. A cover for leaf springs comprising a plurality of substantially U-shaped body sections adapted to be inserted over three sides of a spring, said sections having their end portions arranged in telescoped relation, flexible joints being provided between said sections and comprising coacting arcuately-pressed portions in the transverse wall of the U and coacting tongues which are cut from the metal of the free edges of the sections and bent downwardly against the side walls thereof, thereby locking the sections against displacement, and a cap for said sections.

4. In a cover assembly for leaf springs, a plurality of substantially U-shaped body sections adapted to be applied over the sides and bottom of a spring, the top free edge portions of said sections being formed with outwardly-pressed snap-on beads and inturned flanges, said sections being arranged with their adjacent end portions in telescoped relation, the bottoms of said telescoping end portions being pressed into arcuate shape to provide coacting bearing surfaces and the flanges of said telescoping end portions having tongues cut therefrom and bent downwardly against the inside walls of the outwardly pressed snap-on beads to provide an interlock and a limited pivotal action or hinge for the joint, and a cap member having inturned flanges adapted to engage said snap-on beads.

5. A cover assembly for leaf springs comprising a plurality of substantially U-shaped body sections adapted to be inserted over three sides of a spring, said sections having their end portions arranged in telescoped relation, flexible joints formed in said end portions, a cap member arranged to overlie said sections and be detachably engaged therewith; and a further section particularly adapted for use where clearance space is restricted adjacent the spring, said latter section having side walls free of outwardly protruding portions, a separate cap member provided with side walls having slots therein, and locking tongues struck outwardly from the side walls of said latter section adapted to be passed through said slots to lock the cap in position on the section.

6. A cover assembly for leaf springs comprising a plurality of substantially U-shaped body sections adapted to be inserted over three sides of a spring, said sections having their end portions arranged in telescoped relation, flexible joints formed in said end portions, a channel cap member adapted to overlie said sections and be detachably engaged therewith; and a further section particularly adapted for use where clearance space is restricted adjacent the spring, a separate cap member, both said latter section and cap being provided with side walls which are free of lateral protuberances, said side walls being provided with coacting slots and locking tongues for locking the separate cap to the said latter section.

7. A cover assembly for leaf springs comprising a plurality of substantially U-shaped body sections adapted to be inserted over three sides of a spring, said sections having their end portions arranged in telescoped relation, flexible joints formed in said end portions, a cap member adapted to overlie certain of said sections and be detachably engaged therewith; and a further section particularly adapted for use where clearance space is restricted adjacent the spring, a separate cap member adapted to overlie the sections not covered by the first-named cap member, both said latter section or sections and cap being provided with side walls which are free of lateral protuberances, said side walls being provided with coacting slots and locking tongues for locking the cap to the section, said first-named cap member overlying the adjacent end of said second-named cap member, said cap members having coacting transverse pivotal ribs for facilitating adjustment of said second-named cap member.

8. A cover assembly for leaf springs comprising a plurality of substantially U-shaped body sections adapted to be inserted over three sides of a spring, said sections having their end portions arranged in telescoped relation, flexible joints formed in said end portions, a cap member adapted to overlie said sections and be detachably engaged therewith; and a further section particularly adapted for use where clearance space is restricted adjacent the spring, a separate cap member adapted to overlie said last-named section, both said latter section and cap being provided with side walls which are free of lateral protuberances, said side walls being provided with coacting slots and locking tongues for locking the cap to the section, the contiguous ends of said cap members being formed with interfitting transverse rib portions whereby the position of the first-named cap member is located with respect to the remaining parts of the assembly.

9. A spring cover comprising separable body and cap members, said body member comprising a series of metallic U-shaped sections arranged in end to end relationship and pivotally connected to each other at their adjoining ends, each of said body members provided with a longitudinally extending outwardly projecting rib along the upper free edge thereof, said cap member comprising an integrally formed strip proportioned to cover said series of body sections, each longitudinal edge of said cap member provided with a depending flange proportioned to cover the upper edge of said body section and leaving the major portion thereof exposed, and depressions formed on the inner side of said flanges to receive said longitudinal rib on the body section to secure the cap and body members together.

GEORGE W. CRABTREE.